United States Patent
Salhov et al.

(10) Patent No.: US 9,398,639 B2
(45) Date of Patent: Jul. 19, 2016

(54) METHODS CIRCUITS APPARATUS AND SYSTEMS FOR WIRELESS DATA COMMUNICATION

(75) Inventors: Moshe Salhov, Herzeliya (IL); Roy Kinamon, Tel Aviv (IL)

(73) Assignee: GO NET SYSTEMS LTD., Tel Aviv (IL)

( * ) Notice: Subject to any disclaimer, the term of this patent is extended or adjusted under 35 U.S.C. 154(b) by 0 days.

(21) Appl. No.: 13/806,842

(22) PCT Filed: Jun. 30, 2011

(86) PCT No.: PCT/IL2011/000521
§ 371 (c)(1),
(2), (4) Date: Dec. 25, 2012

(87) PCT Pub. No.: WO2012/001692
PCT Pub. Date: Jan. 5, 2012

(65) Prior Publication Data
US 2013/0107923 A1   May 2, 2013

Related U.S. Application Data

(60) Provisional application No. 61/359,773, filed on Jun. 29, 2010.

(51) Int. Cl.
| | |
|---|---|
| *H04B 7/02* | (2006.01) |
| *H04W 88/08* | (2009.01) |
| *H04B 7/04* | (2006.01) |
| *H04B 7/08* | (2006.01) |
| *H04B 7/06* | (2006.01) |
| *H04L 5/00* | (2006.01) |

(52) U.S. Cl.
CPC ............. *H04W 88/08* (2013.01); *H04B 7/0413* (2013.01); *H04B 7/0689* (2013.01); *H04B 7/086* (2013.01); *H04B 7/0857* (2013.01); *H04B 7/0871* (2013.01); *H04B 7/0617* (2013.01); *H04L 5/0023* (2013.01)

(58) Field of Classification Search
CPC ............................ H04B 7/0413; H04B 7/0617
USPC .................. 375/295, 316, 324, 259, 260, 267
See application file for complete search history.

(56) References Cited

U.S. PATENT DOCUMENTS

| | | | |
|---|---|---|---|
| 7,269,403 B1 * | 9/2007 | Miao .............................. | 455/402 |
| 2005/0130606 A1 * | 6/2005 | Wang et al. ................... | 455/101 |
| 2005/0152314 A1 * | 7/2005 | Sun et al. ...................... | 370/334 |
| 2007/0164902 A1 * | 7/2007 | Bang et al. .................... | 342/377 |
| 2008/0013504 A1 * | 1/2008 | Nishibayashi et al. ........ | 370/338 |
| 2008/0026718 A1 * | 1/2008 | Wangard et al. .............. | 455/266 |
| 2009/0016461 A1 * | 1/2009 | Jitsukawa et al. ............. | 375/267 |
| 2009/0137214 A1 * | 5/2009 | Hofmann et al. ............... | 455/82 |
| 2010/0189084 A1 * | 7/2010 | Chen et al. ..................... | 370/338 |
| 2011/0014866 A1 * | 1/2011 | Sultenfuss et al. ........... | 455/41.2 |

* cited by examiner

*Primary Examiner* — Kevin M Burd

(74) *Attorney, Agent, or Firm* — Vladimir Sherman; Professional Patent Solutions

(57) ABSTRACT

Disclosed are methods, circuits, apparatus and systems for facilitating wireless data communication. According to some embodiments, there may be provided a wireless access point including a set of N antenna elements adapted to receive a transmission, wherein the transmission may include one or more data streams. There may be provided a multi-stream wireless modem circuit including a set of K received signal input nodes. According to further embodiments, a received signal translation block may be adapted to translate a data baring radio frequency signal received through the set of N antenna elements into signal inputs applied at some or all of the K received signal input nodes, wherein translating may include using a translation matrix and/or applying an MRC.

38 Claims, 12 Drawing Sheets

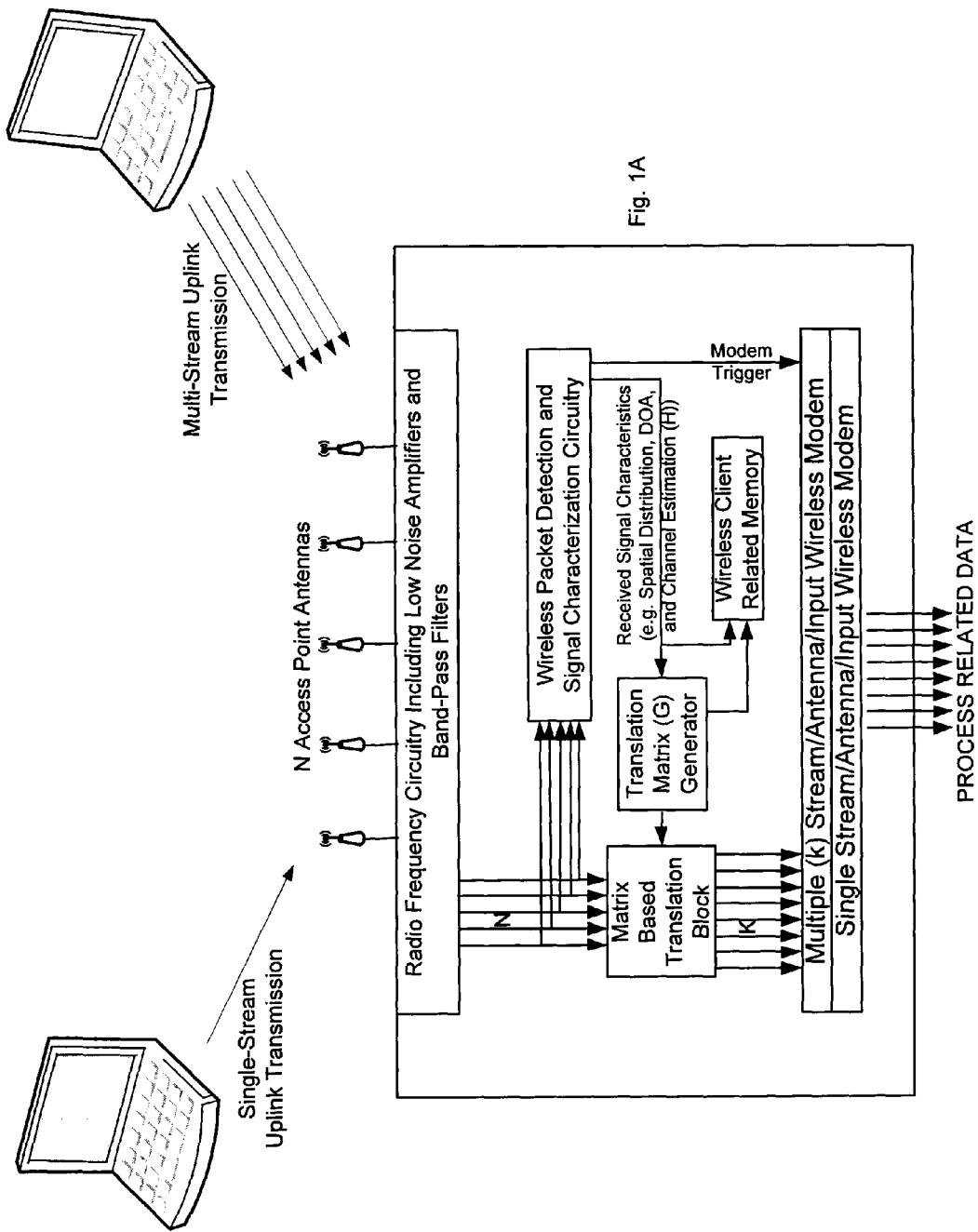

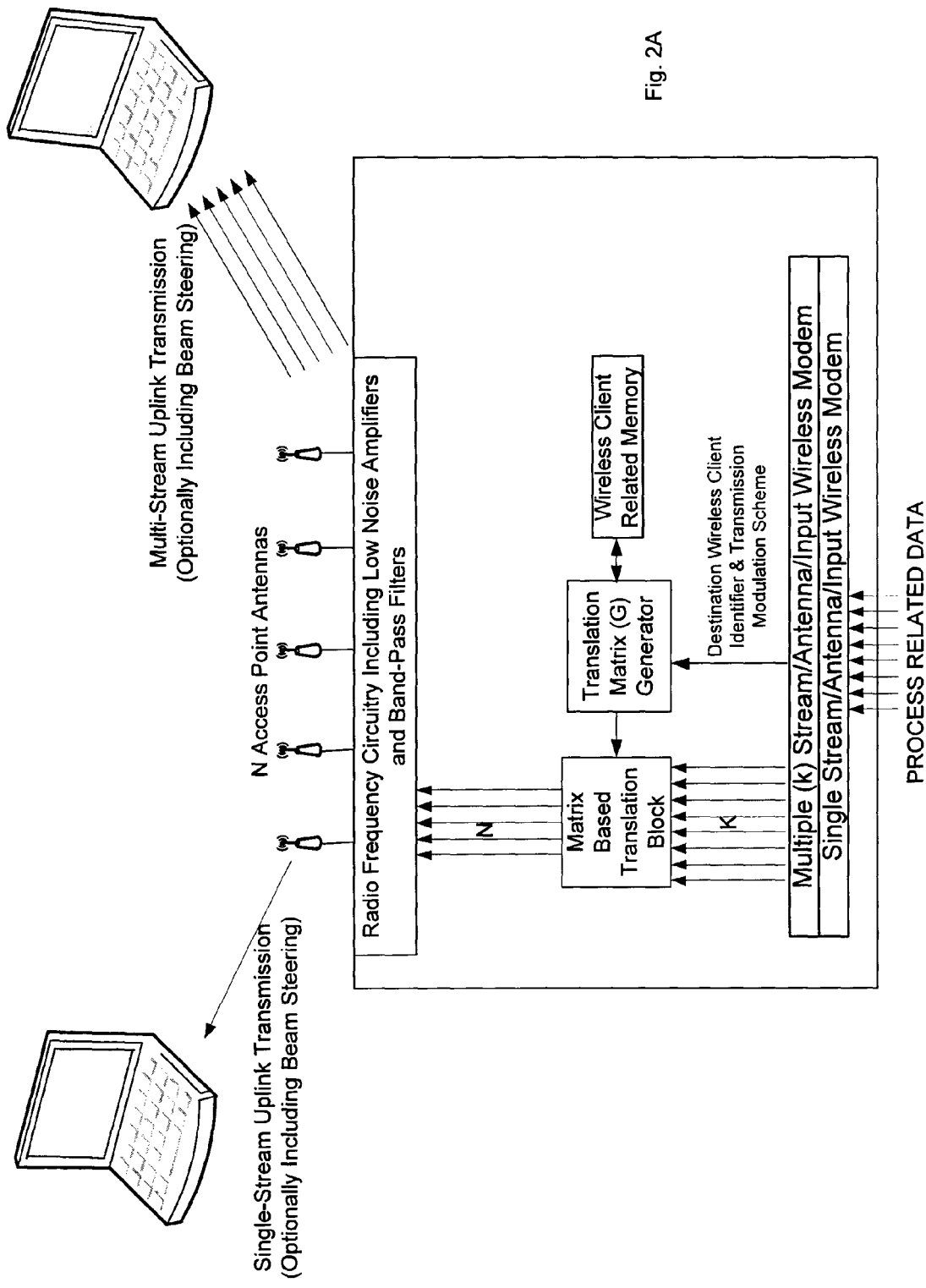

METHODS CIRCUITS APPARATUS AND SYSTEMS FOR WIRELESS DATA COMMUNICATION

FIELD OF THE INVENTION

The present invention generally relates to the field of wireless communication and more particularly to methods, circuits, devices and systems for facilitating wireless communication using multiple antennas.

BACKGROUND

Wireless data communication has rapidly evolved over the past decades since its conception in 1970 by Norman Abramson, who developed the world's first computer communication network, ALOHAnet, using low-cost ham-like radios. With a bi-directional star topology, the ALOHAnet system connected seven computers deployed over four islands to communicate with the central computer on the Oahu Island without using phone lines. In 1979, F. R. Gfeller and U. Bapst published a paper in the IEEE Proceedings reporting an experimental wireless local area network using diffused infrared communications. Shortly thereafter, in 1980, P. Ferrert reported on an experimental application of a single code spread spectrum radio for wireless terminal communications in the IEEE National Telecommunications Conference. In 1984, a comparison between infrared and CDMA spread spectrum communications for wireless office information networks was published by Kaveh Pahlavan in IEEE Computer Networking Symposium which appeared later in the IEEE Communication Society Magazine. In May 1985, the efforts of Marcus led the FCC to announce experimental ISM bands for commercial application of spread spectrum technology. Later on, M. Kavehrad reported on an experimental wireless PBX system using code division multiple access. These efforts prompted significant industrial activities in the development of a new generation of wireless local area networks and it updated several old discussions in the portable and mobile radio industry.

The first generation of wireless data modems was developed in the early 1980s by amateur radio operators, who commonly referred to this as packet radio. They added a voice band data communication modem, with data rates below 9600-bit/s, to an existing short distance radio system, typically in the two meter amateur band. The second generation of wireless modems was developed immediately after the FCC announcement in the experimental bands for non-military use of the spread spectrum technology. These modems provided data rates on the order of hundreds of kilobit/s. The third generation of wireless modem then aimed at compatibility with existing LANs with data rates on the order of several Mbit/s. Several companies developed the third generation products with data rates above 1 Mbit/s, and a couple of products had already been announced by the time of the first IEEE Workshop on Wireless LANs.

The first of the IEEE Workshops on Wireless LAN was held in 1991. At that time, early wireless LAN products had just appeared in the market and the IEEE 802.11 committee had just started its activities to develop a standard for wireless LANs. The focus of that first workshop was the evaluation of the various alternative technologies. The IEEE 802.11 standard and variants and alternatives, such as the wireless LAN interoperability forum and the European HiperLAN specification made rapid progress, and the unlicensed PCS Unlicensed Personal Communications Services and the proposed SUPERNet bands also presented new opportunities.

IEEE 802.11 is a set of standards for carrying out wireless local area network (WLAN) computer communication in the 2.4, 3.6 and 5 GHz frequency bands. They were created and maintained by the IEEE LAN/MAN Standards Committee (IEEE 802). The 802.11 family includes over-the-air modulation techniques that use the same basic protocol. The most popular are those defined by the 802.11b and 802.11g protocols, which are amendments to the 802.11-1997 for the first wireless networking standard, but 802.11b was the first widely accepted one, followed by 802.11g and later 802.11n. Security was originally purposefully weak due to export requirements of some governments, and was later enhanced.

As a means of extending range and improving data throughput of wireless communication systems, such as those defined under the 802 standards, beam-forming techniques and MIMO circuits have been integrated with or applied to the output of wireless transmitters. Beam-forming takes advantage of directionality of an antenna array. When transmitting, a beam-former controls the phase and relative amplitude of the signal at each antenna, in order to create a pattern of constructive and destructive interference in the wavefront. When receiving, information from different sensors/antennas is combined in such a way that the expected pattern of radiation is preferentially observed. MIMO refers to "multiple-input and multiple-output"—a technology which uses multiple antennas at both the transmitter and receiver to improve communication performance. MIMO is one of several forms of smart/adaptive antenna technologies, and may be subdivided into three main categories, pre-coding, spatial multiplexing or SM, and diversity coding:

Pre-coding is multi-layer beam-forming in the narrowest definition. In more general terms, it is considered to be all spatial processing that occurs at the transmitter. In (single-layer) beam-forming, the same signal is emitted from each of the transmit antennas with appropriate phase (and sometimes gain) weighting such that the signal power is maximized at the receiver input. The benefits of beam-forming are to increase the signal gain using constructive interference and to reduce the multipath fading effect. In the absence of scattering, beam-forming results in a well-defined directional pattern, but in typical cellular conventional beams are not a good analogy. When the receiver has multiple antennas, the transmit beam-forming cannot simultaneously maximize the signal level at all of the receive antennas, and precoding is used.

Spatial multiplexing requires MIMO antenna configuration. In spatial multiplexing, a high rate signal is split into multiple lower rate streams and each stream is transmitted from a different transmit antenna in the same frequency channel. If these signals arrive at the receiver antenna array with sufficiently different spatial signatures, the receiver can separate these streams, creating parallel channels. Spatial multiplexing is a very powerful technique for increasing channel capacity at higher signal-to-noise ratios (SNR). The maximum number of spatial streams is limited by the lesser in the number of antennas at the transmitter or at the receiver. Spatial multiplexing can be used with or without transmit channel knowledge.

Diversity Coding techniques are used when there is no channel knowledge at the transmitter. In diversity methods a single stream (unlike multiple streams in spatial multiplexing) is transmitted, but the signal is coded using techniques called space-time coding. The signal is emitted from each of the transmit antennas with full or near orthogonal coding. Diversity coding exploits the independent fading in the multiple antenna links to enhance signal diversity. Spatial multiplexing can also be combined with pre-coding when the channel is known at the transmitter or combined with diversity coding when decoding reliability is in trade-off.

There remain needs in the field of wireless communication for improved methods, circuits, devices and systems for facilitating wireless communication.

SUMMARY OF INVENTION

The present invention may include methods, circuits, apparatus and systems for facilitating wireless communication. According to some embodiments, there may be provided a transmitter translation block, module or unit ("TBMU"), either integral or functionally associated with one or more transmitter circuits (collectively: Multimode Transmitter), of a wireless data transceiver, wherein one or more transmitter circuits may be adapted to operate in a complimenting manner or modes. According to some embodiments, the Multimode Transmitter may be adapted to operate in at least two modes: (1) a first mode where its data signal modulation scheme does not include multiple spatial streams (e.g. as defined in the IEEE 802.11a, b, g standard for example), and (2) a second mode where its data signal modulation scheme does include multiple spatial streams (e.g. as defined in the IEEE 802.11n standard for example). Either or both modes of operation may include signal modulation schemes such as DSSS, CCK and OFDM modulation. The TBMU, or another circuit functionally associated therewith, may detect and/or otherwise determine whether a given transmission of the Multimode Transmitter would benefit from signal translation processing including: (1) beam-forming, (2) channel estimation based signal weighting, (3) MRC, and may apply any one or those or other known translation techniques. In the absence of beam-forming signaling in a transmission signal(s), the TBMU may generate and/or introduce beam-forming signaling into the transmission, which beam-forming may apply to both single-stream and MIMO type signals.

According to further embodiments, there may be provided a receiver translation block, module or unit ("RBFU") which may be either integral or functionally associated with one or more receiver circuits (collectively: Multimode Receiver) of a wireless data transceiver. The one or more receiver circuits may be adapted to operate in a complimenting manner. The RBFU, or another circuit functionally associated therewith, may detect and/or otherwise determine whether a given received transmission, including a single stream or multiple streams, would benefit from a signal translation and perform same.

Control logic may select translation procedures for transmissions from each of the two transmitter circuits. Control logic may also select to which receiver circuit (aka: modem) to route a received signal based on characteristics of the received signal. A signal translation block may apply anyone of a set of translation techniques/procedures (including beam-forming) to a received signal being routed to either of the receivers, optionally based on which receiver is being routed the signal.

According to further embodiments, a wireless access point (AP) may include a set of (N) antenna elements, wherein each element is adapted to receive a version of a radio frequency transmission composed of a data baring signals including one or more transmitted spatial streams. The AP may also include a multi-stream wireless modem circuit including a set of K received signal input nodes and adapted to demodulate a received transmission including one or more spatial streams, and a received signal translation block adapted to translate data baring signals derived from radio frequency signals received at said set of N antenna elements into corresponding signal inputs to said K received signal input nodes by applying a translation matrix which is at least partially generated based on received signal characterization information. The received signal translation block may also apply Maximum Ratio Combining (MRC) to the data baring signals derived from radio frequency signals received at said set of N antenna elements. The AP may also include signal characterization circuitry adapted to provide received transmission signal characterization information. A translation matrix generator of the AP may be adapted to generate a translation matrix for a given received transmission based on received signal characterization information relating to signals of the given received transmission.

According to some embodiment, the signal characterization circuitry may be further adapted to provide signal characterization information of a type selected from the group consisting of: (1) spatial distribution information relating to signals of the given received transmission; (2) Direction-Of-Arrival (DOA) information relating to signals of the given received transmission; and (3) Channel Estimation (H) relating to signals of the given received transmission. The characterization information relating to a received transmission may also include a Direction-of-Arrival (DOA) of a received transmission signal determined to have a relatively highest Signal to Noise Ratio (SNR), and the translation matrix may be generated with a steering vector derived from the determined DOA. Generation of the translation matrix may also be at least partially based on channel estimation (H), wherein the (H) may be used to (1) determine signal DOA's independent from one another and ranked by SNR, and (2) to generate steering vectors corresponding to relatively higher ranked DOA's. According to some embodiments, generation of a translation matrix for a given received transmission may not factor whether the given transmission includes a single or multiple streams.

The AP may further include a digital memory in which either the signal characterization or the translation matrix associated with a given received transmission is stored. The modem circuit may be further adapted to generate a transmission including one or more streams, and the AP may further include a transmission signal translation block adapted to translate the transmission into N antenna transmit signals based on either signal characterization information or a translation matrix stored in said digital memory. The transmission signal translation block may be adapted to apply Maximum Ratio Combining (MRC) to the transmission signals.

According to some embodiments, information retrieved from the digital memory may be based on a transmission indication from the modem circuit, wherein the modem transmission indication may be selected from the group consisting of: (1) transmission destination, and (2) transmission modulation scheme.

According to further embodiments, the wireless access point may further include a single-stream modem circuit and control logic circuitry adapted to select which of the two modems is to be provided an output of said received signal translation block.

According to further embodiments, a wireless access point (AP) may include a set of (N) antenna elements, wherein each element is adapted to receive a version of a radio frequency transmission composed of a data baring signals including one or more transmitted spatial streams. The AP may include: (1) a multi-stream wireless modem circuit with a set of K received signal input nodes and adapted to demodulate a received transmission including two or more spatial streams; (2) a single-stream wireless modem circuit adapted to demodulate a received transmission including a single stream; and (3) control logic circuitry adapted to coordinate demodulation of a received transmission by either or both of the modem circuits. According to some embodiments, the control logic may direct a received transmission to both modems and detect which has demodulated the transmission first and/or best.

According to further embodiments, the AP may include signal characterization circuitry adapted to provide to the control logic circuitry with received transmission signal characterization information relating to a received transmission. The control logic may be adapted to forward a received transmission for demodulation to said single-stream modem when the transmission signal characterization information relating to the received transmission indicates it is a single stream transmission. The control logic may be adapted to forward a received transmission for demodulation to said single-stream modem when the transmission signal characterization information relating to the received transmission indicates it is a single carrier transmission.

According to further embodiments, the AP may include a received signal translation block adapted to translate data baring signals derived from radio frequency signals received at said set of N antenna elements into corresponding signal inputs for either of said modems. The translation may be performed by applying a translation matrix which is at least partially generated based on received signal characterization information.

According to further embodiments the AP may include a translation matrix generator adapted to generate a translation matrix for a given received transmission based on received signal characterization information relating to signals of the given received transmission. The signal characterization circuitry may be further adapted to provide signal characterization information of a type selected from the group consisting of: (1) spatial distribution information relating to signals of the given received transmission; (2) Direction-Of-Arrival (DOA) information relating to signals of the given received transmission; and (3) Channel Estimation (H) relating to signals of the given received transmission. Signal characterization information relating to a received transmission may include a Direction-of-Arrival (DOA) of a received transmission signal determined to have a relatively highest Signal to Noise Ratio (SNR), and the translation matrix is generated with a steering vector derived from the determined DOA.

According to some embodiments, the translation matrix may also be at least partially based on channel estimation (H), wherein the (H) may be used to: (1) determine signal DOA's independent from one another and ranked by SNR, and (2) generate steering vectors corresponding to relatively higher ranked DOA's.

According to further embodiments, the AP may further include digital memory in which either the signal characterization or the translation matrix associated with a given received transmission may be stored. Either of the modem circuits may be further adapted to generate a transmission, and the access point may further include a transmission signal translation block adapted to translate the transmission into N antenna transmit signals based on either signal characterization information or a translation matrix stored in said digital memory. Information retrieved from said digital memory may be based on a transmission indication from the transmitting modem circuit, wherein the modem transmission indication may be selected from the group consisting of: (1) transmission destination, and (2) transmission modulation scheme. Transmission signal translation block and said received signal translation block may be the same translation block.

It should be understood that the received signal and/or the transmission signal translation blocks may provide beam-forming functionality in their respective directions. It should also be understood that under certain embodiments the translation block may include separate signal processing circuits for both a single-stream circuit and for a multi-stream modem circuit. For a single-stream modem, the translation block may be or include a beam-forming block/circuit and/or an MRC circuit. Whereas for a multi-stream modem, the translation block may be or include a spatial expansion block/circuit and/or an MRC circuit. Conversely, any functional blocks and their respective functionality described herein may be integrated into a single multifunction circuit as known today or to be devised in the future.

According to further embodiments, there may be provided a transceiver arrangement including a first transmitter circuit adapted to transmit a data baring signal using a modulation technique including beam-forming. A second transmitter circuit may be adapted to transmit a data bearing signal using a modulation technique not-including beam-forming, and a selective beam-forming unit may be adapted to selectively operate on a signal generated by the second circuit. The transceiver arrangement may include an adaptive antenna adapted to transmit signals, also including signals processed/conditioned using an adaptive antenna signal processing/conditioning technique. The transceiver arrangement may apply processing/conditioning techniques such as MIMO (Multiple Input Multiple Output) processing/conditioning.

The transceiver arrangement may be implemented with the first transmitter circuit, the second transmitter circuit, the selective beam-forming unit and the adaptive antenna being integrated on a single chip.

The transceiver arrangement may be implemented with the first transmitter circuit, the second transmitter circuit and the selective beam-forming unit being integrated on a first chip, and the adaptive antenna being implemented on a second chip.

The transceiver arrangement may be implement with the first transmitter circuit being integrated on a first chip, the second transmitter circuit being integrated on a second chip, and the selective beam-forming unit and the adaptive antenna being integrated on a third chip.

According to further embodiments, a transceiver arrangement may include a first receiver circuit adapted to receive a data bearing signal transmitted using a modulation technique including beam-forming. A second receiver circuit may be adapted to receive a data bearing signal transmitted using a modulation technique not-including beam-forming, and a selective beam-forming unit may be adapted to detect whether a received signal was transmitted using a modulation technique including beam-forming and selectively operate on the received signal according to the detection.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A shows an exemplary functional block diagram of an Access Point according to some embodiments, including functional blocks and signal flow associated with receiving transmissions from wireless clients;

FIG. 2A shows an exemplary functional block diagram of an Access Point according to some embodiments, including functional blocks and signal flow associated with transmitting to wireless clients;

Figure 1B:
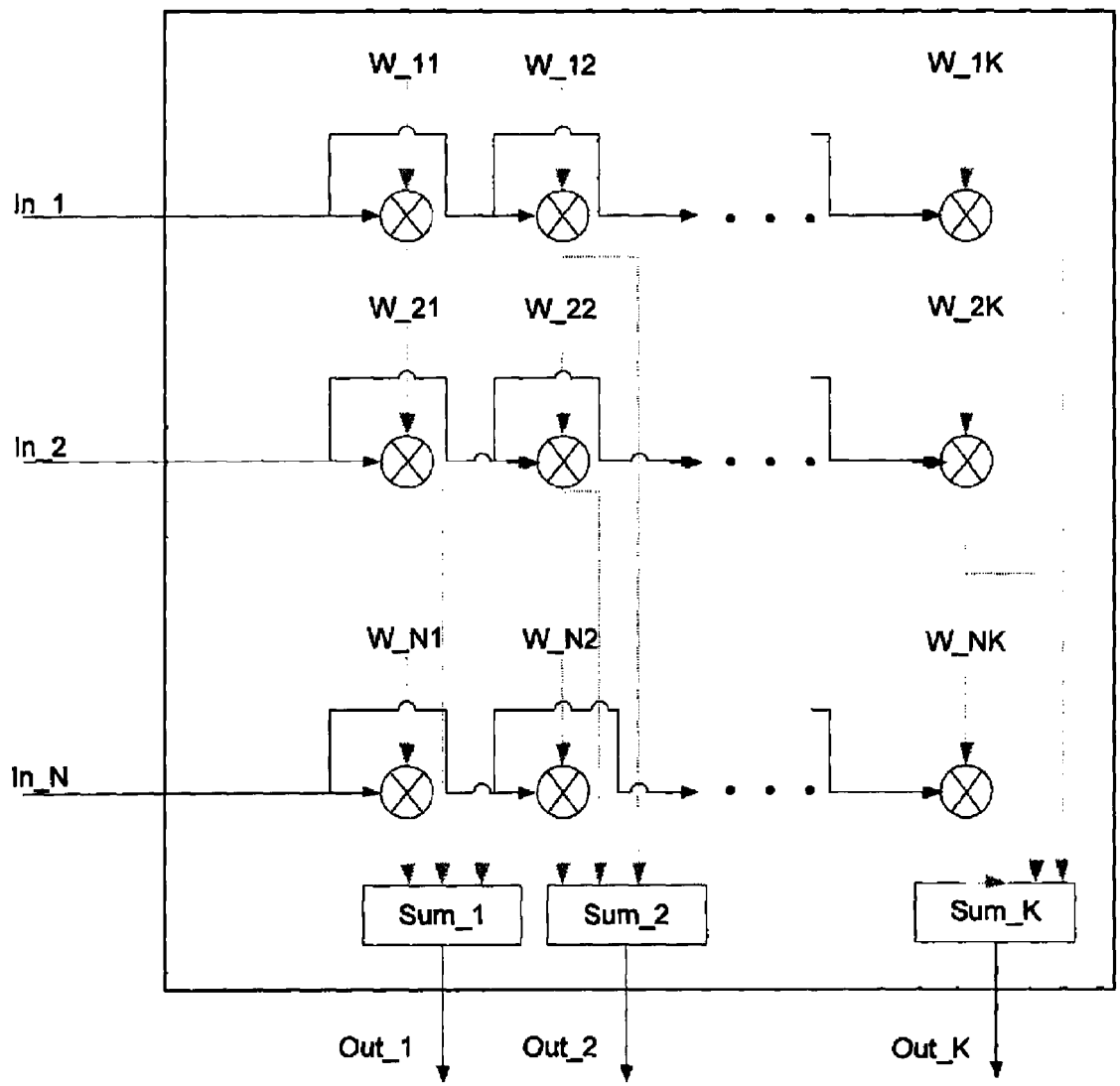
FIG. 1B is a functional block diagram of an exemplary received signal translation block according to embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, general purpose or dedicated processor, controller, control logic, application specific integrated circuit ("ASIC"), field programmable gate array, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, DVDs, magnetic-optical disks, read-only memories (ROMs), random access memories (RAMs) electrically programmable/erasable read-only memories (EPROMs, EEPROMs, NROMs, FLASH, SONOS, etc.), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be understood that some embodiments of the present invention may be used in a variety of applications. Although embodiments of the invention are not limited in this respect, one or more of the methods, devices and/or systems disclosed herein may be used in many applications, e.g., civil applications, military applications or any other suitable application. In some demonstrative embodiments the methods, devices and/or systems disclosed herein may be used in the field of computer networking, wireless computer networking, Personal Computers (PC), for example, as part of any suitable desktop PC, notebook PC, monitor, and/or PC accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Figure 2B:
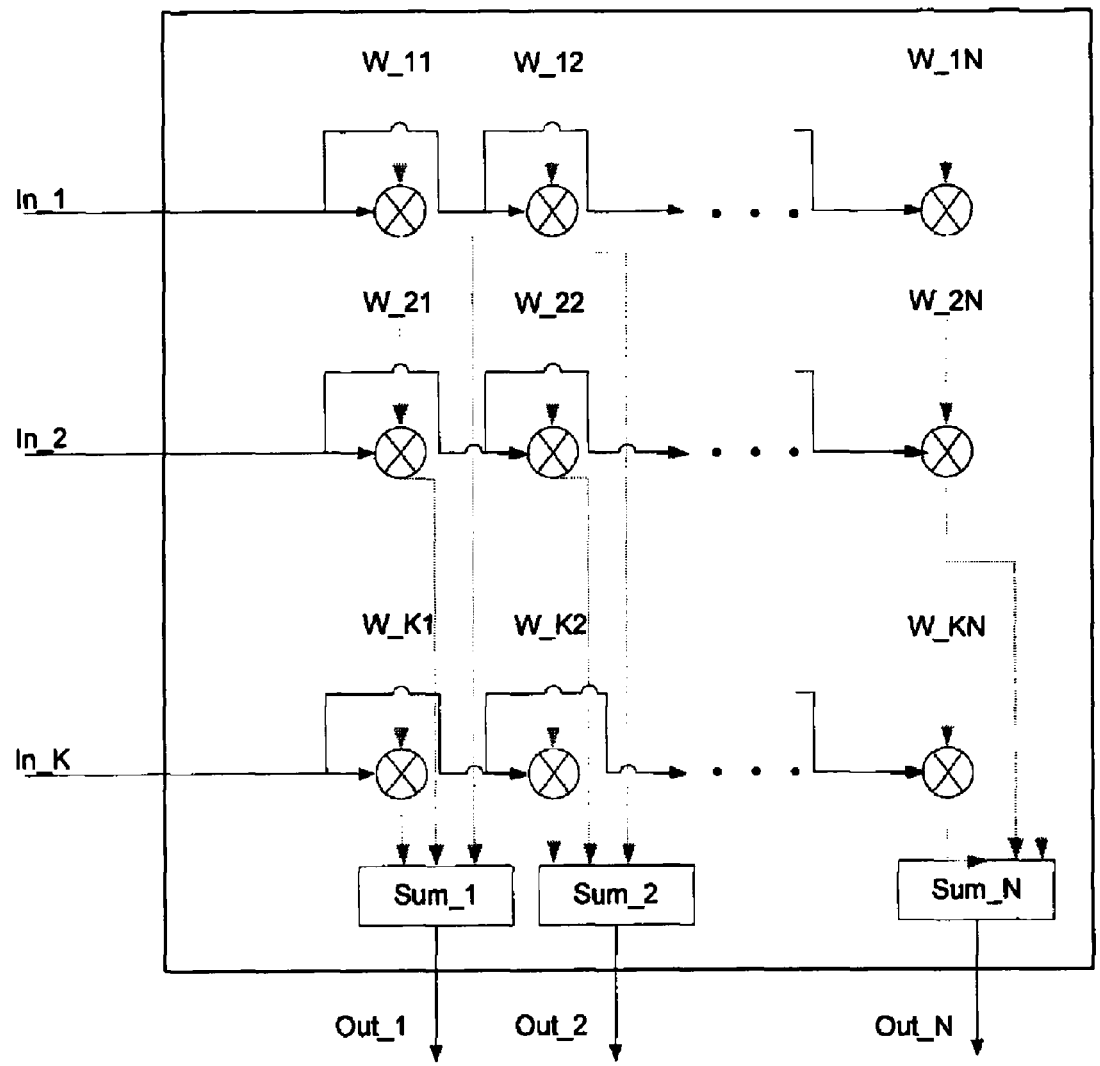
FIG. 2B is functional block diagram of an exemplary transmit signal translation block according to embodiments.

Turning now to FIG. 1A, there is shown an exemplary functional block diagram of an Access Point according to some embodiments, including functional blocks and signal flow associated with receiving transmissions from wireless clients. FIG. 2A shows an exemplary functional block diagram of an Access Point according to some embodiments, including functional blocks and signal flow associated with transmitting to wireless clients. As part of the present invention, as evident from these figures, a wireless access point (AP) may include a set of (N) antenna elements, wherein each element is adapted to receive a version of a radio frequency transmission composed of a data baring signals including one or more transmitted spatial streams. The AP may also include a multi-stream wireless modem circuit including a set of K received signal input nodes and adapted to demodulate a received transmission including one or more spatial streams, and a received signal translation block adapted to translate data baring signals derived from radio frequency signals received at said set of N antenna elements into corresponding signal inputs to said K received signal input nodes by applying a translation matrix which is at least partially generated based on received signal characterization information. The received signal translation block may also apply Maximum Ratio Combining (MRC) to the data baring signals derived from radio frequency signals received at said set of N antenna elements. The AP may also include signal characterization circuitry adapted to provide received transmission signal characterization information. A translation matrix generator of the AP may be adapted to generate a translation matrix for a given received transmission based on received signal characterization information relating to signals of the given received transmission.

According to some embodiment, the signal characterization circuitry may be further adapted to provide signal characterization information of a type selected from the group consisting of: (1) spatial distribution information relating to signals of the given received transmission; (2) Direction-Of-Arrival (DOA) information relating to signals of the given received transmission; and (3) Channel Estimation (H) relating to signals of the given received transmission. The characterization information relating to a received transmission may also include a Direction-of-Arrival (DOA) of a received transmission signal determined to have a relatively highest Signal to Noise Ratio (SNR), and the translation matrix may be generated with a steering vector derived from the determined DOA. Generation of the translation matrix may also be at least partially based on channel estimation (H), wherein the (H) may be used to (1) determine signal DOA's independent from one another and ranked by SNR, and (2) to generate steering vectors corresponding to relatively higher ranked DOA's. According to some embodiments, generation of a translation matrix for a given received transmission may not factor whether the given transmission includes a single or multiple streams.

The AP may further include a digital memory in which either the signal characterization or the translation matrix associated with a given received transmission is stored. The modem circuit may be further adapted to generate a transmission including one or more streams, and the AP may further include a transmission signal translation block adapted to translate the transmission into N antenna transmit signals based on either signal characterization information or a translation matrix stored in said digital memory. The transmission signal translation block may be adapted to apply Maximum Ratio Combining (MRC) to the transmission signals.

According to some embodiments, information retrieved from the digital memory may be based on a transmission indication from the modem circuit, wherein the modem transmission indication may be selected from the group consisting of: (1) transmission destination, and (2) transmission modulation scheme.

According to further embodiments, the wireless access point may further include a single-stream modem circuit and control logic circuitry adapted to select which of the two modems is to be provided an output of said received signal translation block.

According to further embodiments, a wireless access point (AP) may include a set of (N) antenna elements, wherein each element is adapted to receive a version of a radio frequency transmission composed of a data baring signals including one or more transmitted spatial streams. The AP may include: (1) a multi-stream wireless modem circuit with a set of K received signal input nodes and adapted to demodulate a received transmission including two or more spatial streams; (2) a single-stream wireless modem circuit adapted to demodulate a received transmission including a single stream; and (3) control logic circuitry adapted to coordinate demodulation of a received transmission by either or both of the modem circuits. According to some embodiments, the control logic may direct a received transmission to both modems and detect which has demodulated the transmission first and/or best.

According to further embodiments, the AP may include signal characterization circuitry adapted to provide to the control logic circuitry with received transmission signal characterization information relating to a received transmission. The control logic may be adapted to forward a received transmission for demodulation to said single-stream modem when the transmission signal characterization information relating to the received transmission indicates it is a single stream transmission. The control logic may be adapted to forward a received transmission for demodulation to said single-stream modem when the transmission signal characterization information relating to the received transmission indicates it is a single carrier transmission.

According to further embodiments, the AP may include a received signal translation block adapted to translate data baring signals derived from radio frequency signals received at said set of N antenna elements into corresponding signal inputs for either of said modems. The translation may be performed by applying a translation matrix which is at least partially generated based on received signal characterization information.

According to further embodiments the AP may include a translation matrix generator adapted to generate a translation matrix for a given received transmission based on received signal characterization information relating to signals of the given received transmission. The signal characterization circuitry may be further adapted to provide signal characterization information of a type selected from the group consisting of: (1) spatial distribution information relating to signals of the given received transmission; (2) Direction-Of-Arrival (DOA) information relating to signals of the given received transmission; and (3) Channel Estimation (H) relating to signals of the given received transmission. Signal characterization information relating to a received transmission may include a Direction-of-Arrival (DOA) of a received transmission signal determined to have a relatively highest Signal to Noise Ratio (SNR), and the translation matrix is generated with a steering vector derived from the determined DOA.

According to some embodiments, the translation matrix may also be at least partially based on channel estimation (H), wherein the (H) may be used to: (1) determine signal DOA's independent from one another and ranked by SNR, and (2) generate steering vectors corresponding to relatively higher ranked DOA's.

According to further embodiments, the AP may further include digital memory in which either the signal characterization or the translation matrix associated with a given received transmission may be stored. Either of the modem circuits may be further adapted to generate a transmission, and the access point may further include a transmission signal translation block adapted to translate the transmission into N antenna transmit signals based on either signal characterization information or a translation matrix stored in said digital memory. Information retrieved from said digital memory may be based on a transmission indication from the transmitting modem circuit, wherein the modem transmission indication may be selected from the group consisting of: (1) transmission destination, and (2) transmission modulation scheme. Transmission signal translation block and said received signal translation block may be the same translation block.

Exemplary Methods for Calculating Translation Matrix (G) in Various Scenarios:

Let n be the number of receive antennas, k the number of modem inputs, H a channel estimate matrix size m-by-n where m is number of transmit antennas on the client mobile side.

In reception case G may be one of several options

Using DOA info:

G=[streer vector to the maximal SNR; Streer vector to other direction_1; Streer vector to other direction_2 . . . ; Streer vector to other direction_k−1]

Using channel estimates H

G=U where U is the n by k left eigenvectors of H that corresponds to the k largest eigenvalues of C weighted with the respected eigenvalue power 2

General option:

G is random matrix with rank k or any matrix with rank k

System related options

We can discriminate between a DSSS signal and an OFDM signal and use G_1 for DSSS and G_2 for OFDM where:

G_1=k steer vectors each size 1 by n

G_2=U where U is the n by k left eigenvectors of H that corresponds to the k largest eigenvalues of C weighted with the respected eigenvalue power 2

In the transmission case we know how many spatial streams are transmitted hence

Single streams—means we will use beamforming/beam-steering

For the Multiple streams case we will use one of several options

G=[streer vector to the maximal SNR; Streer vector to other direction_1; Streer vector to other direction_2 . . . ; Streer vector to other direction_k−1]

Where the steering vectors are known from the uplink and were stored in memory

We can also use channel estimates H

G=U where U is the n by k left eigenvectors of H that corresponds to the k largest eigenvalues of C weighted with the respected eigenvalue power 2

Paudo code for generating G for example:

Estimate the spatial distribution

Find K none over taping DOA with best SNR/correlation

Generate steering vectors to the k DOAs

Assembly G from the k vectors

It should be understood that the received signal and/or the transmission signal translation blocks may provide beam-forming functionality in their respective directions. It should also be understood that under certain embodiments the translation block may include separate signal processing circuits for both a single-stream circuit and for a multi-stream modem circuit. For a single-stream modem, the translation block may be or include a beam-forming block/circuit and/or an MRC circuit. Whereas for a multi-stream modem, the translation block may be or include a spatial expansion block/circuit and/or an MRC circuit. Conversely, any functional blocks and their respective functionality described herein may be integrated into a single multifunction circuit/block known today or to be devised in the future. For example, any of these functional blocks and/or their functionality may be integrated and/or described within the context of beam-forming units and/or adaptive/smart antenna array circuits.

The present invention includes methods, circuits, apparatus and system for facilitating wireless communication. According to some embodiments, there may be provided a transmitter beam-forming module or unit ("TBMU") which is either integral or functionally associated with one or more transmitter circuits (collectively: Multimode Transmitter) of a wireless data transceiver, which one or more transmitter circuits may be adapted to operate in a complimenting manner. According to some embodiments, the Multimode Transmitter may be adapted to operate in at least two modes: (1) a first mode where data signal modulation scheme does not include beam-forming signaling or array processing (e.g. as defined in the IEEE 802.11a, b, g standard for example), and (2) a second mode where data signal modulation scheme does include beam-forming signaling or array processing (e.g. as defined in the IEEE 802.11n standard for example). Either or both modes of operation may include signal modulation schemes such as DSSS, CCK and OFDM modulation with single or multiple information streams. The beam-forming module/unit, or another circuit functionally associated therewith, may detect and/or otherwise determine whether a given transmission of the Multimode Transmitter includes beam-forming signaling or array processing. In the absence of beam-forming signaling or array processing being present in a transmission signal(s) (i.e. Multimode Transmitter is operating in first mode), the beam-forming module/unit may generate and/or introduce beam-forming signaling or array processing into the transmission. It should be understood that the term "beam-forming" as used in the present application applies to MIMO signal processing/conditioning and any other adaptive antenna signal processing/conditioning technique known today or to be devised in the future.

According to further embodiments, the transmitter beam-forming module/unit may include or be functionally associated with a transmission chain (TX chain) including signal phase shifters, signal amplifiers, an antenna array—such as an adaptive antenna array (which may be collectively referred to as an adaptive antenna). The beam-forming module/unit may be adapted to generate and/or introduce beam-forming signaling or array processing to the transmission (e.g. through phase shifters, amplifiers, or digital processing etc.) according to any technique known today or to be devised in the future. Likewise, the beam-forming module/unit may be adapted to generate and/or introduce spatial diversity related signal processing or array processing to the transmission according to any technique known today or to be devised in the future. Conversely, in the event that the transmission includes beam-forming and/or spatial coding or array processing, the transmitter beam-forming module/unit may forward the transmission directly to a functionally associated antenna or adaptive antenna, or the transmitter beam-forming module may adapt the transmission signals to comply with equal of higher number of antennas (for example from k signals to n antennas).

According to further embodiments, there may be provided a receiver beam forming module or unit ("RBFU") which is either integral or functionally associated with one or more receiver circuits (collectively: Multimode Receiver) of a wireless data transceiver, which one or more receiver circuits may be adapted to operate in a complimenting manner. The receiver beam-forming module/unit, or another circuit functionally associated therewith, may detect and/or otherwise determine whether a given received transmission from a transmitter operating in single or multimode includes single stream of information or multiple streams, and if so, which modulation scheme was used. In the case the received transmission consists of single stream, the receiver beam-forming module/unit may forward, directly, through a switching circuit or through a transformation module, the received signal to an appropriate receiver circuit adapted to decode the single stream received signal. Likewise, in the event the receiver beam-forming module/unit, or another circuit functionally associated therewith, detects that the received signal includes multiple streams compliant with a given standard (e.g. 802.11n for example) supported by a given one of the one or more receiver circuits, the receiver beam-forming module/unit may forward, directly or through a switching circuit, the received signal to the given receiver circuit—without processing the signal or following array processing designed to adapt the number of received transmission signals to the number of receive paths supported by the given receiver circuit.

According to further embodiments, the receiver beam-forming module/unit may be integral or functionally associated with a receiver chain (RX chain) including signal phase shifters, signal amplifiers, signal processing unit, and an antenna array—such as an adaptive antenna array (collectively referred to as an adaptive antenna). The receiver beam-forming module/unit may be adapted to beam-form (i.e. array process) the received transmission (e.g. through the RX chain phase shifters, amplifiers, signal processing unit, etc.) according to any technique known today or to be devised in the future. The receiver beam-forming module/unit may be likewise adapted to perform inverse spatial expansion (i.e. transform the number of input signals n into a number of output signals k) to the received transmission (e.g. through the RX chain phase shifters, amplifiers, signal processing unit, etc.) according to any technique known today or to be devised in the future.

According to further embodiments, a transmitter beam-forming module/unit may be integral with some or all of the one or more transmitter circuits. According to further embodiments, a receiver beam-forming module/unit may be integral with some or all of the one or more receiver circuits. Either of the transmitter and receiver beam-forming modules/units may be integral or functionally associated with a signal switch adapted to switch between one or more adaptive antenna taps and one or more associated receiver and transmitter circuits. A beam-forming signaling or signal conditioning detector may be integral or functionally associated with either the beam-forming module/unit or with any other element along the TX/RX chains of a transceiver designed, fabricated or operated according to embodiments of the present invention.

According to some embodiments of the present invention, there is provided a transceiver arrangement including a first transmitter circuit adapted to transmit a data bearing signal using a modulation technique including beam-forming, a second transmitter circuit adapted to transmit a data bearing signal using a modulation technique not-including beam-forming, and a selective beam-forming module/unit adapted to selectively operate on a signal generated by the second circuit.

According to further embodiments of the present invention, there is provided a transceiver arrangement including a first receiver circuit adapted to receive a data bearing signal transmitted using a modulation technique consisting a single stream, a second receiver circuit adapted to receive a data bearing signal transmitted using a modulation technique consisting multiple streams, and a selective beam-forming unit adapted to detect whether a received signal was transmitted using a modulation technique including single stream and selectively operate on the received signal according to the detection.

According to some exemplary embodiments, the present invention includes the use of any 802.11a, b, g, n chips, circuits or devices, integral or functionally associated with a selective beam-forming module/unit, which selectively applies adaptive antenna techniques (wide sense beam-forming, MIMO etc.) to the DSSS/CCK type signals generated on the chips, circuits or devices. Some exemplary embodiments may include: (1) a 802.11a, b, g and n compliant chip that may also include a beam-forming module/unit (adaptive antenna circuit) for selective beam-forming (adaptive antenna) processing of DSSS/CCK signals integrated therein, (2) a 802.11a, b, g and n compliant chip connected to a selective beam-forming module/unit (adaptive antenna circuit) which selectively operates on DSSS/CCK signals generated on the chip; and multiple 802.11 chips, including an 802.11n compliant chip, connected to a selective beam-forming module/unit (adaptive antenna circuit) which selectively operates on DSSS/CCK type signals from the non 802.11n chips.

According to some exemplary embodiments of the present invention, the invention system may consist of a single chip that may implement the functions of both the 802.11n and 802.11b modems.

When an 802.11b transmission is required, the control logic may set the switch and the adaptive antenna configuration to transmit, when an 802.11n transmission is required the control logic may set the switch and transmit without the adaptive antenna configuration or with spatial expansion tailored to adapt the number of transmit path of the 802.11n modulator and the number of antenna array elements.

Figure 3A:
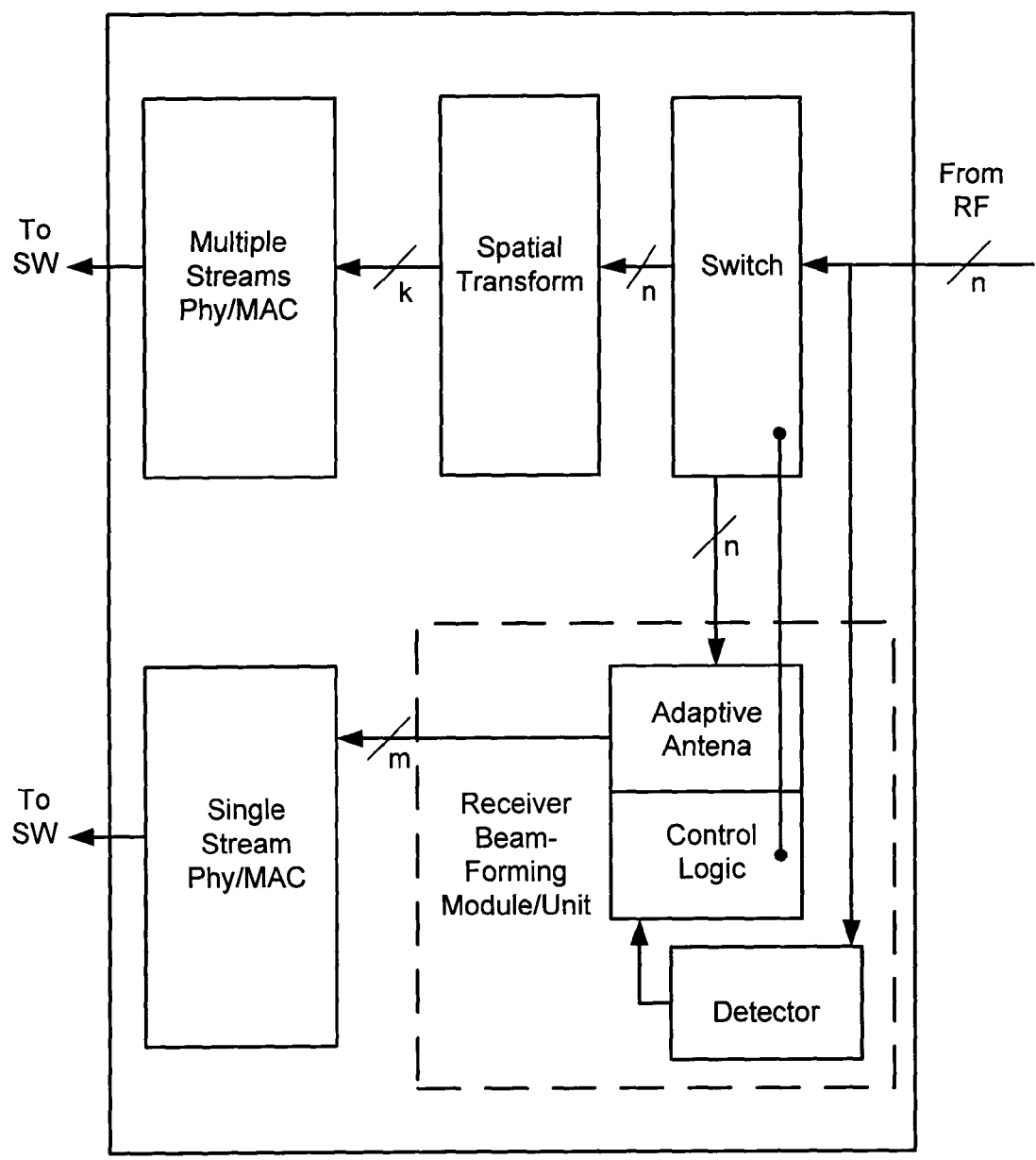
FIG. 3A shows an exemplary block diagram of a transceiver according to some embodiments of the present invention where two different receiver circuits and beam-forming module/unit are integrated on a single chip.

Turning now to FIG. 3A, there is shown, in accordance with some embodiments of the present invention, the receiving side of a system for facilitating wireless communication wherein the system consists of a single chip. According to some embodiments, when a signal is received from the RF it may be passed to a detector and to both the modem blocks and. The detector may estimate the type of signal, for example according to the known preamble that each signal type has. If the signal is determined to be a 802.11b signal (e.g. DSSS or CCK signal) the switch may be configured to pass the RF signal to the 802.11b modem, otherwise it may be passed to the 802.11n modem.

Figure 3B:
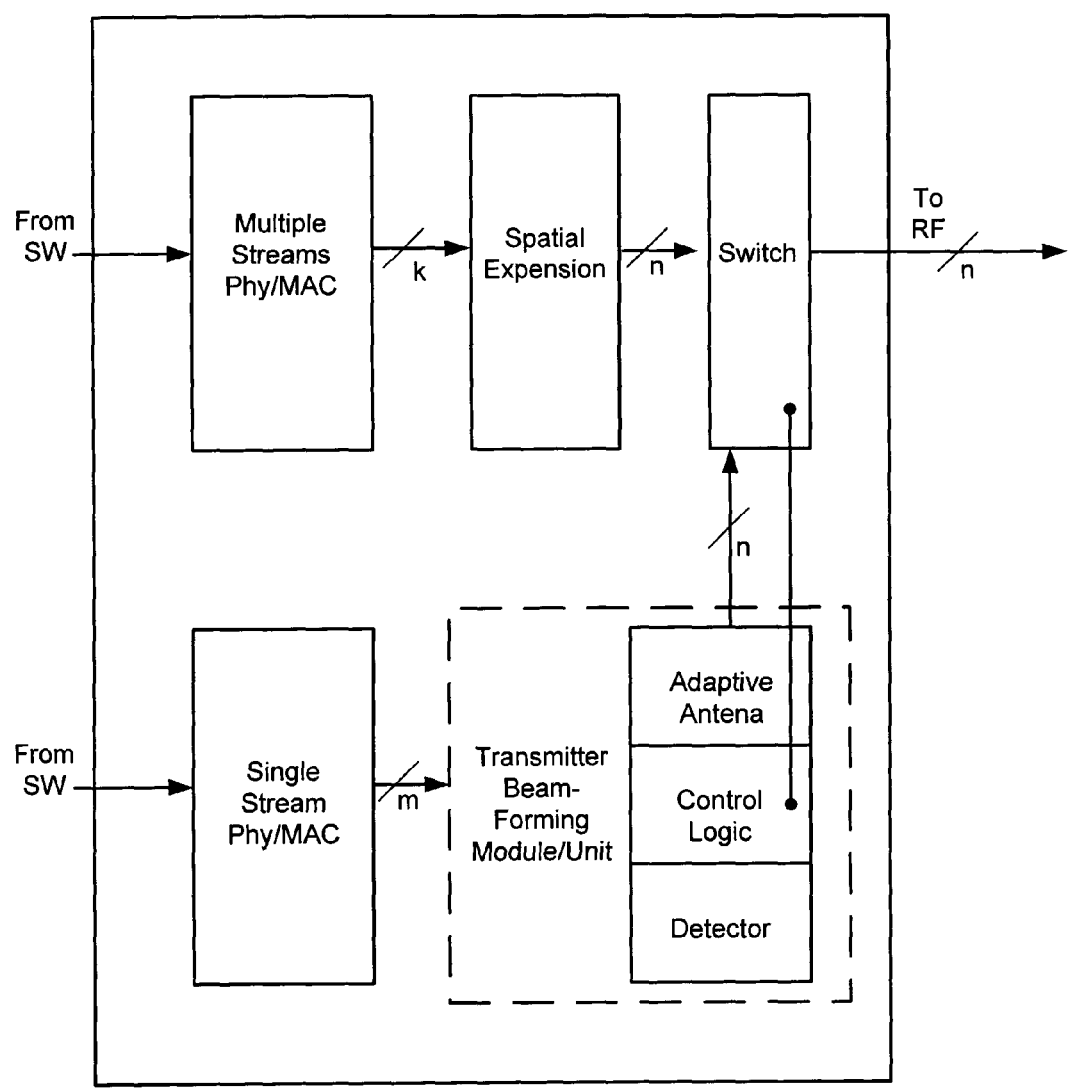
FIG. 3B shows an exemplary block diagram of a transceiver according to some embodiments of the present invention where two different transmitter circuits and a beam-forming module/unit are integrated on a single chip or device.

Turning now to FIG. 3B, there is shown, in accordance with some embodiments of the present invention, a system for facilitating wireless communication wherein the system consists of a single chip that may integrate and implement the functions of the 802.11n modem, the 802.11b modem and the beam-forming module/unit. When an 802.11b transmission is required the control logic may set the switch and the adaptive antenna configuration to transmit.

Figure 4A:
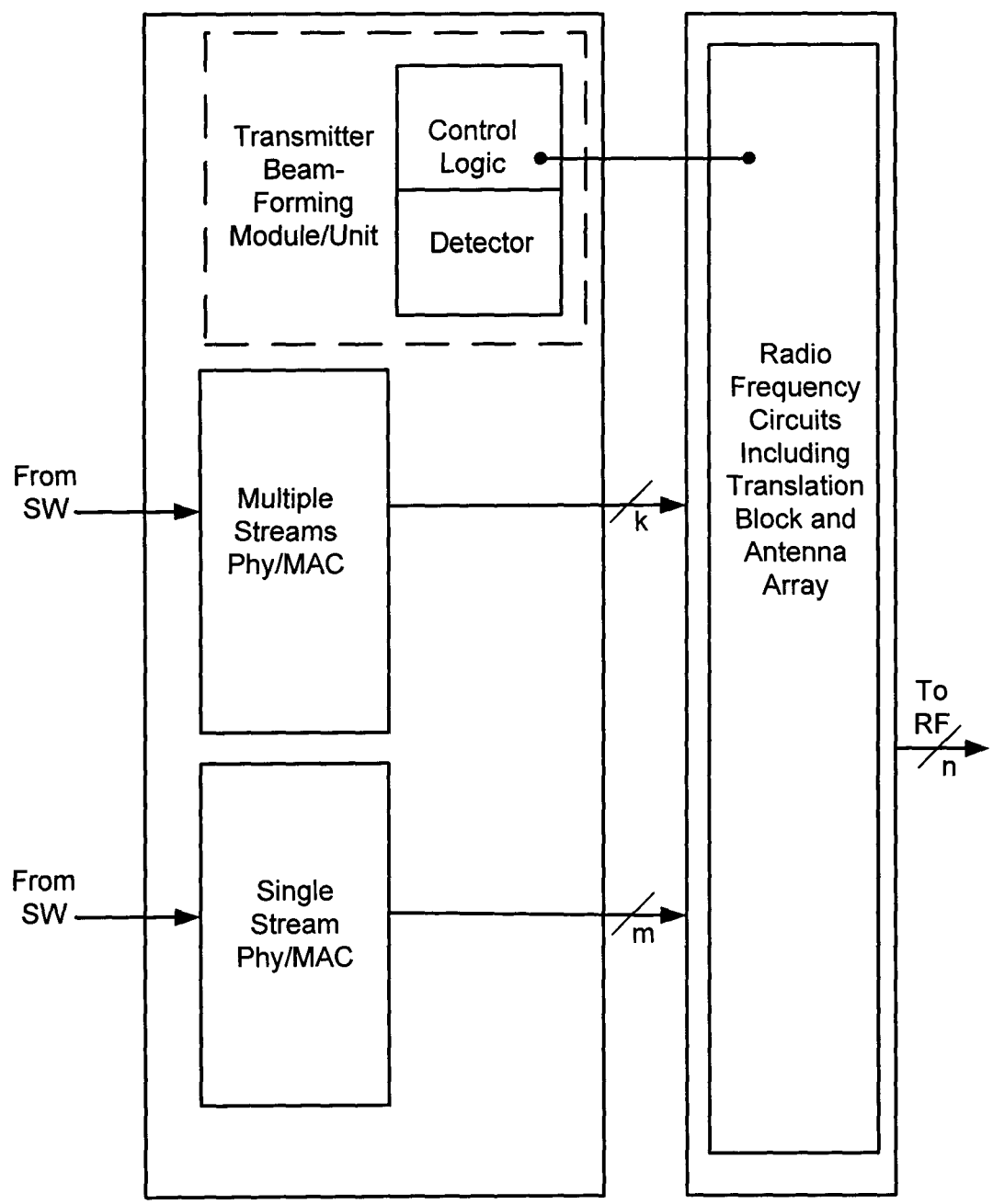
FIG. 4A shows an exemplary block diagram of a transceiver according to some embodiments of the present invention wherein two different transmitter circuits are integrated on a first chip and the beam-forming module/unit is on second chip or device.

Turning now to FIG. 4A, there is shown, in accordance with some embodiments of the present invention, a system for facilitating wireless communication wherein the system consists of two chips (e.g. ASIC/FPGA/DSP). A first chip that may integrate and implement the functions of the 802.11n and the 802.11b modems, and a second chip that may implement the adaptive antenna array. According to some embodiments, the adaptive antenna may determine which protocol is used for transmission based on messages from the control logic. Adaptive antenna functionality may then be tailored in accordance with the determined signal type (e.g. OFDM/DSSS/CCK or 802.11n type rates).

Figure 4B:
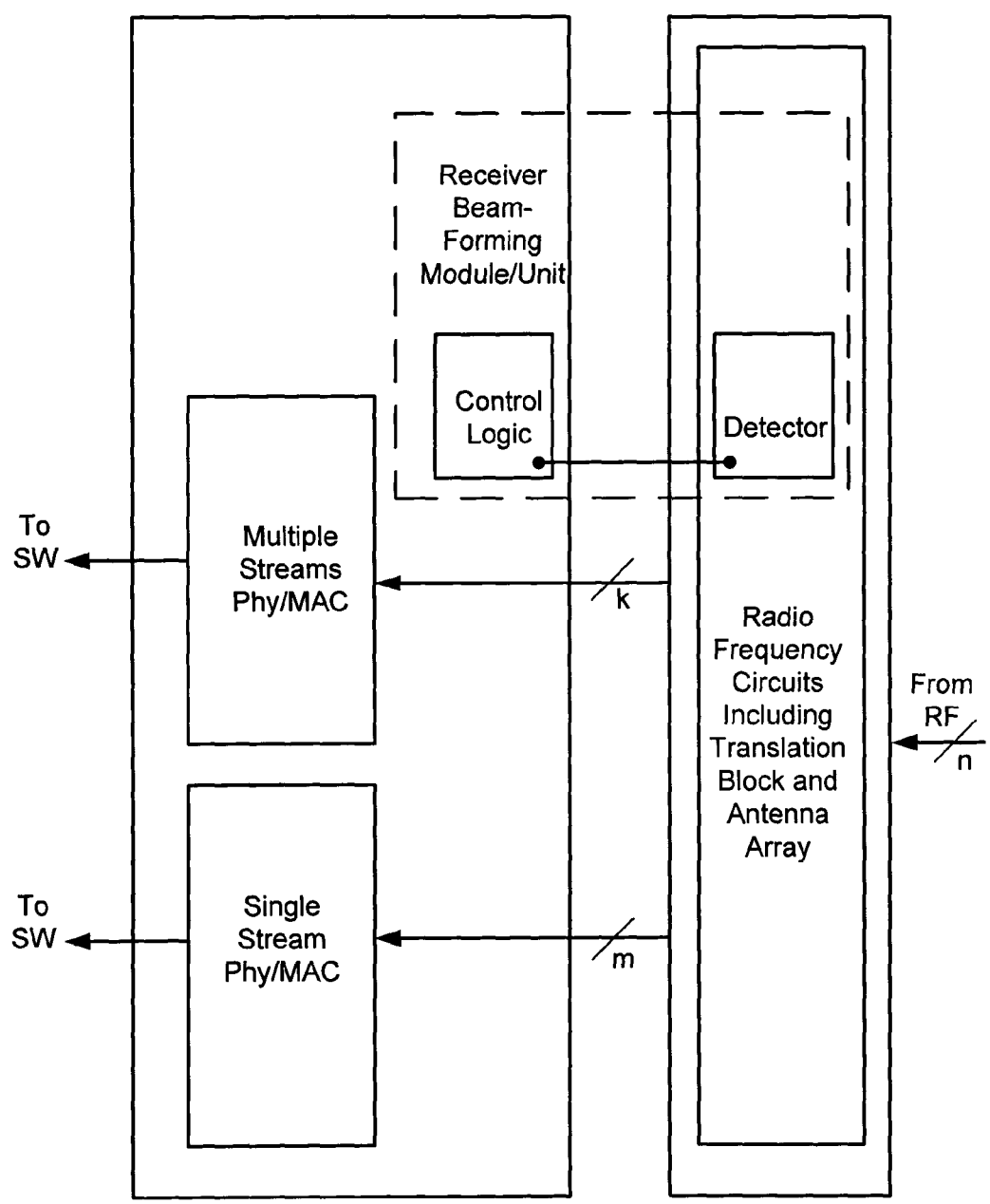
FIG. 4B shows an exemplary block diagram of a transceiver according to some embodiments of the present invention wherein two different receiver circuits are integrated on a first chip and a beam-forming module/unit is on a second chip or device.

Turning now to FIG. 4B, there is shown, in accordance with some embodiments of the present invention, the receiving side of a system for facilitating wireless communication wherein the system consists of two chips (e.g. ASIC/FPGA/DSP). A first chip that may integrate and implement the functions of the 802.11n and the 802.11b modems, and a second chip that may implement the adaptive antenna array. According to some embodiments, the adaptive antenna module may comprise a detector and may thus implement the detection function. The detection output may be passed to the control logic and from there to the SW. If the detector detects 802.11b type signals then the adaptive antenna signal frequency outputs (i.e. the signal after beam-forming) may be passed to the 802.11b modem block, otherwise the signal frequency outputs may be passed to the 802.11n modem block. According to some embodiments, the signal frequency functionality may be tailored in accordance with the detector's 802.11n signal estimation (e.g. DSSS/CCK/OFDM or other 802.11n signal).

Figure 5A:
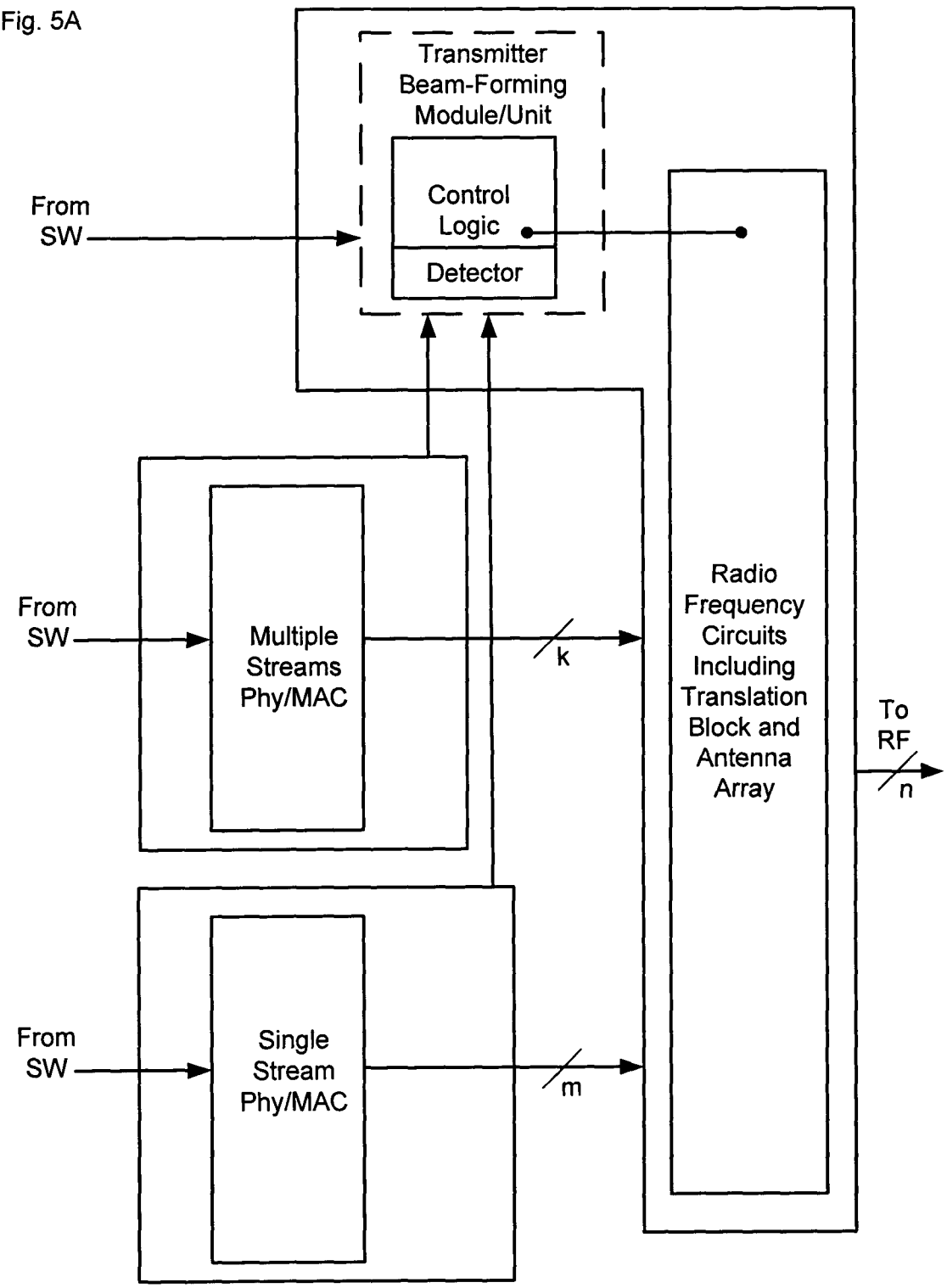
FIG. 5A shows an exemplary block diagram of a transceiver according to some embodiments of the present invention wherein two different transmitter circuits and the beam-forming module/unit are each implemented on separate chips or devices.
Figure 5B:
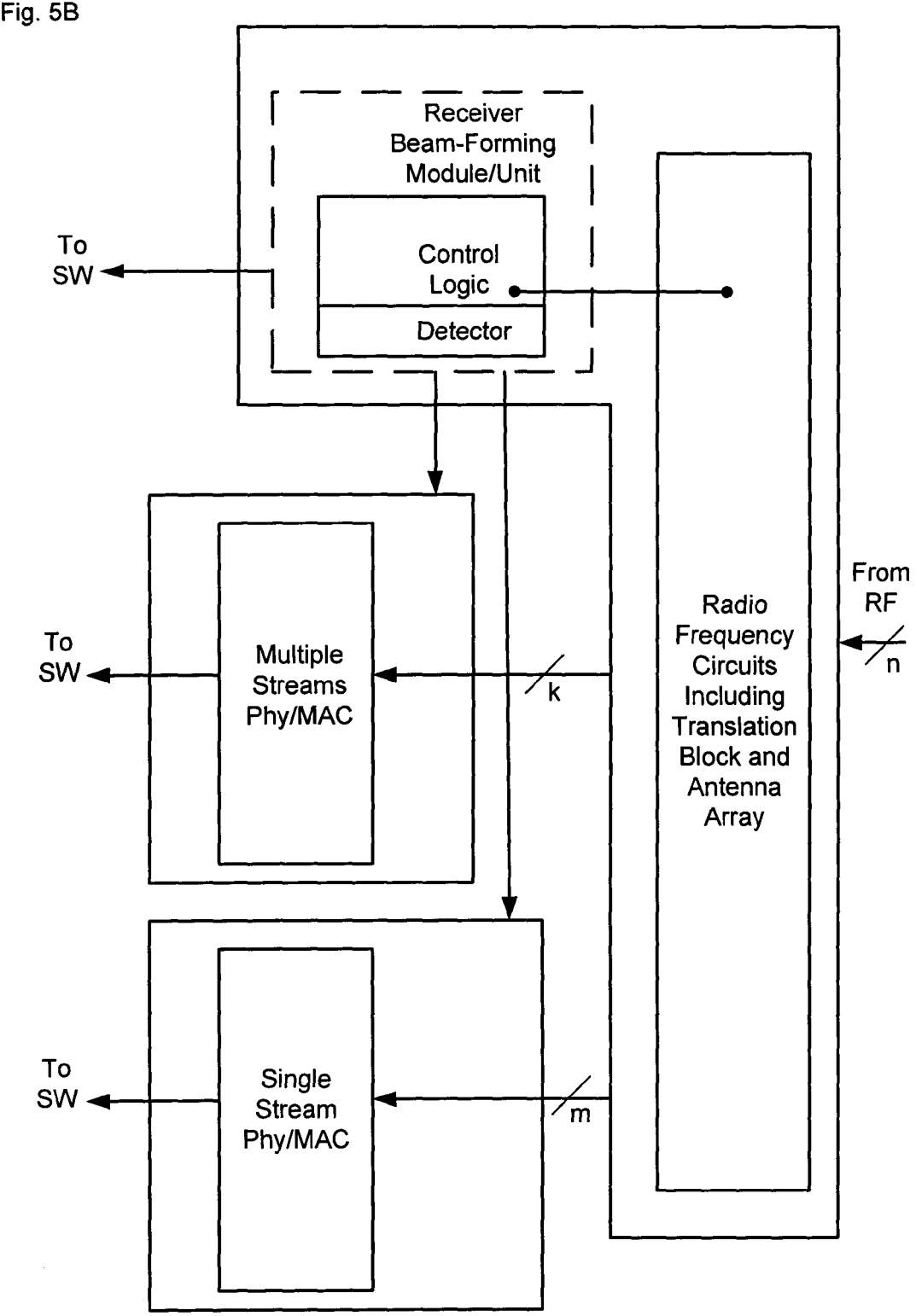
FIG. 5B shows an exemplary block diagram of a transceiver according to some embodiments of the present invention wherein two different receiver circuits and the beam-forming module/unit are each implemented on separate chips or devices.
Figure 6A:
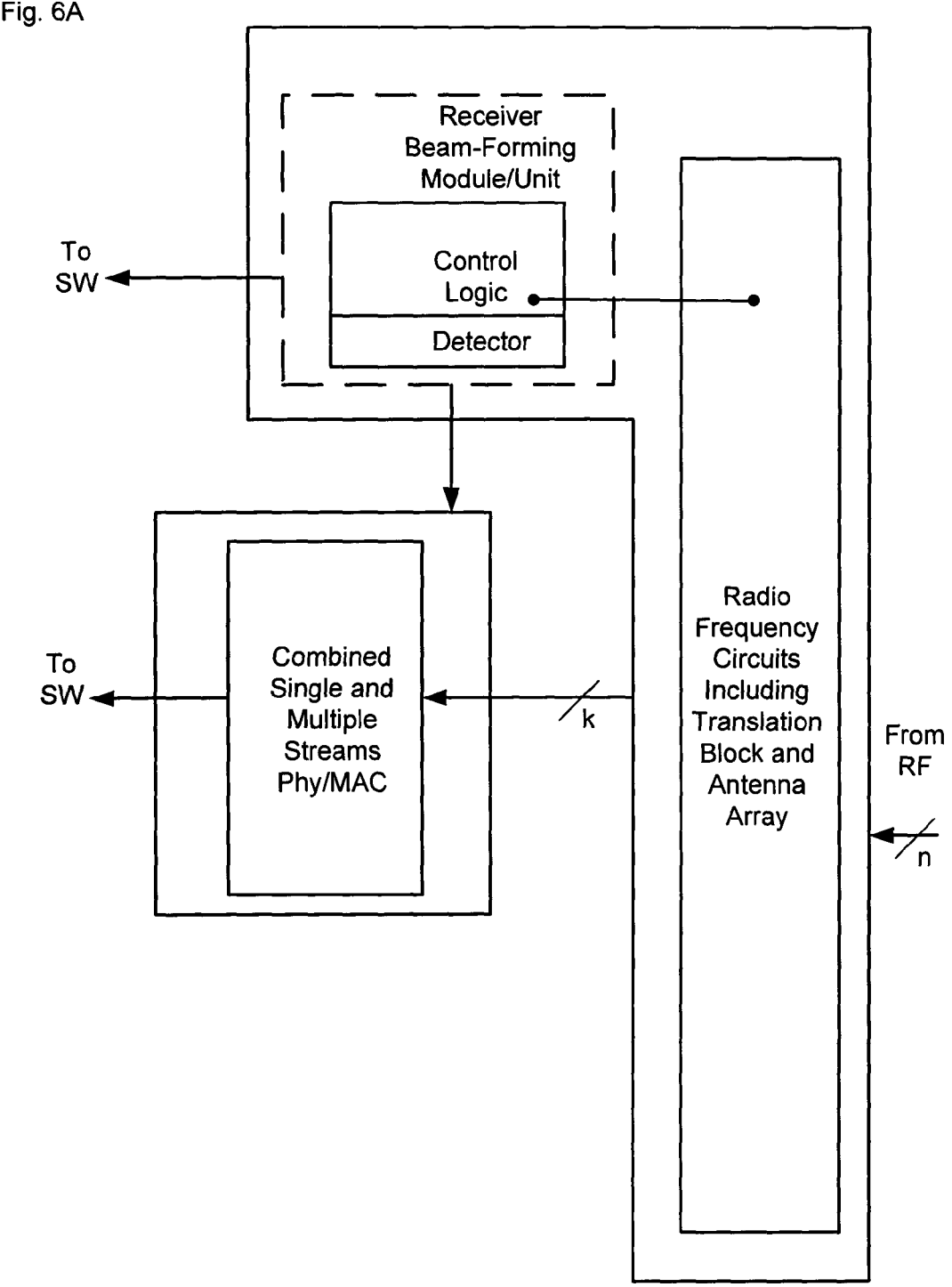
FIG. 6A shows an exemplary block diagram of a transceiver according to some embodiments of the present invention wherein two different receiver circuits are on a single chip and the beam-forming module/unit are implemented on a separate chip or device.
Figure 6B:
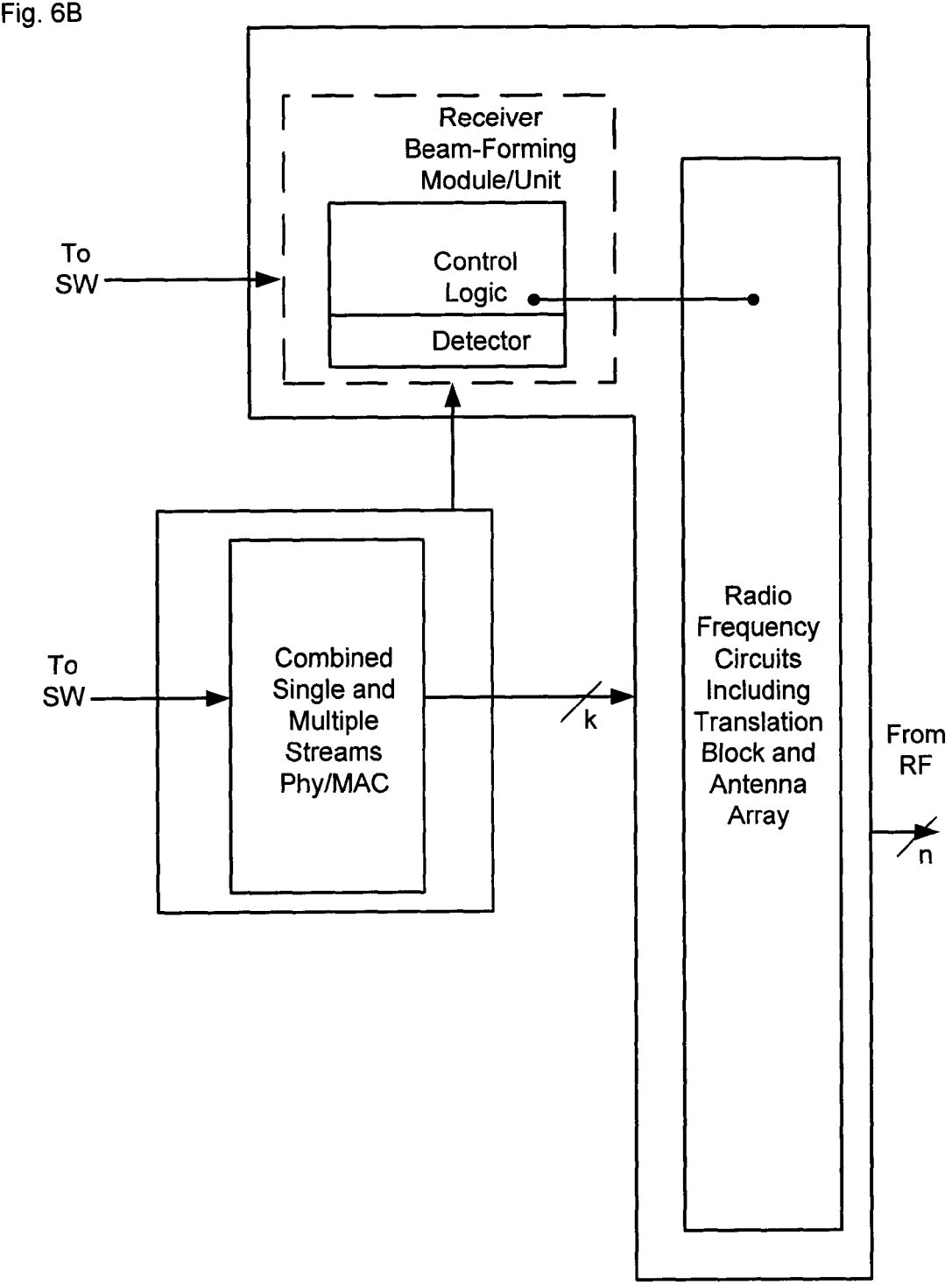
FIG. 6B shows an exemplary block diagram of a transceiver according to some embodiments of the present invention wherein two different transmitter circuits are on a single chip and the beam-forming module/unit are implemented on a separate chip or device.

Turning now to FIG. 5A, there is shown, in accordance with some embodiments of the present invention, a system for facilitating wireless communication wherein the system consists of three chips (e.g. ASIC/FPGA/DSP). Two chips and may implement the functions of the 802.11n modem and the 802.11b respectively, and a third chip may implement the adaptive antenna array and optionally the control logic. According to some embodiments, the adaptive antenna may determine which protocol is used for transmission based on messages from the control logic. Adaptive antenna functionality may then be tailored in accordance with the determined signal type (e.g. OFDM/DSSS/CCK or 802.11n type rates).

Turning now to FIG. 5A, there is shown, in accordance with some embodiments of the present invention, the receiving side of a system for facilitating wireless communication wherein the system consists of three chips (e.g. ASIC/FPGA/DSP). Two chips and may implement the functions of the 802.11n modem and the 802.11b respectively, and a third chip may implement the adaptive antenna array and optionally the control logic. According to some embodiments, the adaptive antenna module may comprise a detector and may thus implement the detection function. The detection output may be passed to the control logic and from there to the SW. If the detector detects 802.11b type signals then the adaptive antenna signal frequency outputs (i.e. the signal after beam-forming) may be passed to the 802.11b modem block, otherwise the signal frequency outputs may be passed to the 802.11n modem block. According to some embodiments, the signal frequency functionality may be tailored in accordance with the detector's 802.11n signal estimation (e.g. DSSS/CCK/OFDM or other 802.11n signal).

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A wireless access point comprising:
    a set of N antenna elements, wherein each element is adapted to receive a version of a radio frequency transmission composed of data bearing signals including one or more transmitted spatial streams;
    a multi-stream wireless modem circuit including a set of K received signal input nodes and adapted to demodulate a received transmission including one or more spatial streams; and
    a received signal translation block positioned on a signal path between said set of N antenna elements and said multi-stream wireless modem and adapted to translate N data bearing signals derived from radio frequency signals received at said set of N antenna elements into K corresponding signal inputs to said K received signal input nodes, by applying a translation matrix to the N data bearing signals, which translation matrix is generated based at least partially on received signal characterization information;
    wherein N and K are each natural numbers larger than 1, N≠K and the translation matrix is generated and applied such that each of the N data bearing signals effects at least one of the K corresponding signal inputs.

2. The wireless access point according to claim 1, wherein the received signal translation block also applies Maximum Ratio Combining (MRC) to the N data bearing signals.

3. The wireless access point according to claim 1, further comprising signal characterization circuitry adapted to provide received transmission signal characterization information.

4. The wireless access point according to claim 3, further comprising a translation matrix generator adapted to generate a translation matrix for a given received transmission based on received signal characterization information relating to signals of the given received transmission.

5. The wireless access point according to claim 4, wherein said signal characterization circuitry is further adapted to provide signal characterization information of a type selected from the group consisting of: (1) spatial distribution information relating to signals of the given received transmission; (2) Direction-Of-Arrival (DOA) information relating to signals of the given received transmission; and (3) Channel Estimation (H) relating to signals of the given received transmission.

6. The wireless access point according to claim 5, wherein signal characterization information relating to a received transmission includes a Direction-of-Arrival (DOA) of a received transmission signal determined to have a relatively highest Signal to Noise Ratio (SNR), and the translation matrix is generated with a steering vector derived from the determined DOA.

7. The wireless access point according to claim 6, wherein generation of the translation matrix is also at least partially based on channel estimation (H).

8. The wireless access point according to claim 7, wherein the (H) is used to: (1) determine signal DOA's independent from one another and ranked by SNR, and (2) generate steering vectors corresponding to relatively higher ranked DOA's.

9. The wireless access point according to claim 7, wherein generation of a translation matrix for a given received transmission does not factor whether the given transmission includes a single or multiple streams.

10. The wireless access point according to claim 4, further comprising digital memory in which either the signal characterization or the translation matrix associated with a given received transmission is stored.

11. The wireless access point according to claim 10, wherein said modem circuit is further adapted to generate a transmission including one or more streams, and wherein said access point further includes a transmission signal translation block adapted to translate the transmission into N antenna transmit signals based on either signal characterization information or a translation matrix stored in said digital memory.

12. The wireless access point according to claim 11, wherein said transmission signal translation block is adapted to apply Maximum Ratio Combining (MRC) to the transmission signals.

13. The wireless access point according to claim 11, wherein information retrieved from said digital memory is based on a transmission indication from said modem circuit.

14. The wireless access point according to claim 13, wherein said modem transmission indication is selected from the group consisting of: (1) transmission destination, and (2) transmission modulation scheme.

15. The wireless access point according to claim 11, wherein said transmission signal translation block and said received signal translation block are the same translation block.

16. The wireless access point according to claim 1, further comprising a single-stream modem circuit.

17. The wireless access point according to claim 16, further comprising control logic circuitry adapted to select which of the two modems is to be provided an output of said received signal translation block.

18. A wireless access point comprising:
a set of N antenna elements, wherein each element is adapted to receive a version of a radio frequency transmission composed of one or more transmitted spatial streams;
a multi-stream wireless modem circuit including a set of K received signal input nodes and adapted to demodulate a received transmission including two or more spatial streams;
a single-stream wireless modem circuit adapted to demodulate a received transmission including a single stream; wherein said single-stream wireless modem circuit and said multi-stream wireless modem circuit are separate physical components;
a switch located on a signal path between said antenna elements and said multi-stream and single-stream modems;
a detector adapted to sample signals received by said antenna elements prior to their arrival at said switch and determine whether a given received transmission includes multiple spatial streams; and
control circuitry adapted to cause said switch to: (i) direct the given received transmission to said multi-stream modem if said detector determines that the given received transmission includes multiple spatial streams; and (ii) direct the given received transmission to said single-stream modem if said detector determines that the given received transmission includes a single spatial stream.

19. The wireless access point according to claim 18, further comprising signal characterization circuitry adapted to provide to said control circuitry received transmission signal characterization information relating to a received transmission.

20. The wireless access point according to claim 19, wherein said control circuitry is adapted to forward a received transmission for demodulation to said single-stream modem when the transmission signal characterization information relating to the received transmission indicates it is a single stream transmission.

21. The wireless access point according to claim 20, wherein said control circuitry is adapted to forward a received transmission for demodulation to said single-stream modem when the transmission signal characterization information relating to the received transmission indicates it is a single carrier transmission.

22. The wireless access point according to claim 18, further comprising a received signal translation block adapted to translate N data bearing signals derived from radio frequency signals received at said set of N antenna elements into K corresponding signal inputs for either of said modems, wherein K≠N and the translation matrix is generated and applied such that each of the N data bearing signals effects the K corresponding signal inputs.

23. The wireless access point according to claim 22, wherein translation is performed by applying a translation matrix which is generated based at least partially on received signal characterization information.

24. The wireless access point according to claim 23, further comprising a translation matrix generator adapted to generate a translation matrix for a given received transmission based on received signal characterization information relating to versions of signals of the given received transmission received at one or more of said N antenna elements.

25. The wireless access point according to claim 24, wherein said signal characterization circuitry is further adapted to provide signal characterization information of a type selected from the group consisting of: (1) spatial distribution information relating to signals of the given received transmission; (2) Direction-Of-Arrival (DOA) information relating to signals of the given received transmission; and (3) Channel Estimation (H) relating to signals of the given received transmission.

26. The wireless access point according to claim 25, wherein signal characterization information relating to a received transmission includes a Direction-of-Arrival (DOA) of a received transmission signal determined to have a relatively highest Signal to Noise Ratio (SNR), and the translation matrix is generated with a steering vector derived from the determined DOA.

27. The wireless access point according to claim 26, wherein generation of the translation matrix is also at least partially based on channel estimation (H).

28. The wireless access point according to claim 27, wherein the (H) is used to: (1) determine signal DOA's independent from one another and ranked by SNR, and (2) generate steering vectors corresponding to relatively higher ranked DOA's.

29. The wireless access point according to claim 28, further comprising digital memory in which either the signal characterization or the translation matrix associated with a given received transmission is stored.

30. The wireless access point according to claim 29, wherein either of said modem circuits is further adapted to generate a transmission, and wherein said access point further includes a transmission signal translation block adapted to translate the transmission into N antenna transmit signals based on either signal characterization information or a translation matrix stored in said digital memory.

31. The wireless access point according to claim 30, wherein information retrieved from said digital memory is based on a transmission indication from the transmitting modem circuit.

32. The wireless access point according to claim 31, wherein said modem transmission indication is selected from the group consisting of: (1) transmission destination, and (2) transmission modulation scheme.

33. The wireless access point according to claim 32, wherein said transmission signal translation block and said received signal translation block are the same translation block.

34. A received signal translation system comprising:
signal characterization circuitry adapted to sample a set of N versions of a wireless signal, each of the versions received at one of a set of N antenna elements; and
a signal translation block comprising processing circuitry positioned on a signal path between the set of N antenna elements and a multi-stream wireless modem having K input nodes, said translation block being adapted to translate the N versions of the wireless signal into K corresponding signal inputs for the K input nodes, by applying a translation matrix to the N versions of the wireless signal, which translation matrix is generated based at least partially on signal characterization information provided by said signal characterization circuitry;
wherein N and K are each natural numbers larger than 1, N≠K and the translation matrix is generated and applied such that each of the N data bearing signals effects at least one of the K corresponding signal inputs.

35. The system according to claim 34, wherein the signal translation block also applies Maximum Ratio Combining (MRC) to the N versions of the wireless signal.

36. The system according to claim 34, wherein signal characterization information provided by said signal characterization circuitry includes a Direction-of-Arrival (DOA) of the wireless signal determined to have a relatively highest Signal to Noise Ratio (SNR), and the translation matrix is generated with a steering vector derived from the determined DOA.

37. The system according to claim 34, wherein generation of the translation matrix is also at least partially based on channel estimation (H).

38. The system according to claim 37, wherein the (H) is used to: (1) determine signal DOA's independent from one another and ranked by SNR, and (2) generate steering vectors corresponding to relatively higher ranked DOA's.

* * * * *